Aug. 2, 1932.  L. D. SOUBIER  1,869,920

MACHINE FOR FORMING HOLLOW GLASSWARE

Filed Sept. 1, 1927  5 Sheets-Sheet 1

Inventor
Leonard D. Soubier
By
J. F. Rule,
Attorney

Aug. 2, 1932.  L. D. SOUBIER  1,869,920
MACHINE FOR FORMING HOLLOW GLASSWARE
Filed Sept. 1, 1927  5 Sheets-Sheet 3

Aug. 2, 1932.   L. D. SOUBIER   1,869,920
MACHINE FOR FORMING HOLLOW GLASSWARE
Filed Sept. 1, 1927   5 Sheets-Sheet 4

Inventor
Leonard D. Soubier
By J. F. Rule
Attorney

Patented Aug. 2, 1932

1,869,920

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

MACHINE FOR FORMING HOLLOW GLASSWARE

Application filed September 1, 1927. Serial No. 216,824.

The present invention relates to improvements in machines for forming hollow glassware, and particularly to means for removing finished ware from the forming molds at a predetermined station.

Ejection of finished ware from glassware forming machines, according to the present practice, subjects the ware to more or less rough handling, which, in many instances, causes distortion of a nature necessitating discarding of the ware.

An object of the present invention is to provide automatic means individual to the molds of a forming machine to grasp ware just in advance of opening of the finishing molds and transfer such ware to a predetermined point following opening of the molds. To this end, the glassware forming machine is equipped with take-out devices corresponding in number to that of the finishing molds and adapted to be brought into operative engagement with articles in the finishing molds following the usual final blowing of the articles in said molds. Automatic means is provided to release articles from the take-out devices after they have been moved laterally away from the molds to a ware receiver such as an endless conveyor which may function as a leer feeder, if desired.

A further object is to provide in combination with ware take-out mechanism of the above character, means to supply air pressure or freely circulating cooling air to the interior of the articles during the period of time in which the take-out mechanism is engaged with articles in the molds. Thus, such application of air may be utilized to chill and thereby set the glass in the molds or to exert an expanding pressure internally of the ware to prevent collapse of the walls.

Another object is to provide an endless ware conveyor in combination with take-out mechanism and a rotary machine of the above character, and so drive the conveyor that its lineal speed may be readily synchronized with the peripheral speed of the forming machine to thereby insure proper transfer of ware from the machine to said conveyor.

It is likewise an object of the present invention to provide means for supplying air pressure or freely circulating cooling air to articles in the finishing molds of a rotary forming machine by way of the usual knockout disks of knock-out mechanisms which are individual to the molds. Thus, the glass in the articles is firmly set prior to their ejection from the molds and they are therefore less liable to collapse than if the additional air treatment were eliminated.

Other objects will be apparent hereinafter.

In the accompanying drawings:

Fig. 1 is a sectional elevation of one mold head or unit of a bottle blowing machine equipped with my improved take-out device and means for applying air internally of articles in the finishing mold.

Fig. 2 is a detail sectional view showing the air pressure supply chamber and control valve therefor.

Fig. 2—A is a detail perspective view of the sectional adjustable air control cam.

Referring to the drawings, the invention is shown applied to a forming machine of the well known Owens type comprising a stationary central pillar 15 rising from a base 16 and on which is mounted a rotary mold carriage 81 which supports an annular series of mold heads or units 17 and may be continuously or intermittently rotated by a suitable motor (not shown). Each unit comprises a vertically movable frame 18 supporting a set of forming molds. The finishing mold 19 (Fig. 1) is mounted upon a supporting frame 20, hinged to the lower section 21 of the mold carriage 81 and cooperates with the neck mold 22 and blow head 23 in the usual manner.

Figure 11:
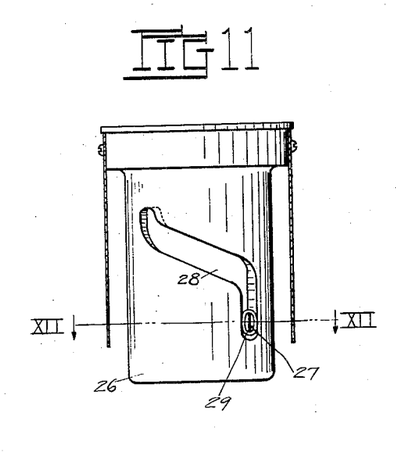
Fig. 11 is a detail view showing the bearing for the take-out supporting arm.
Figure 12:
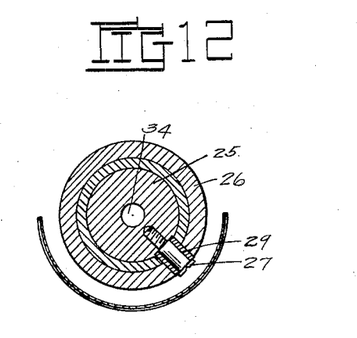
Fig. 12 is a sectional view taken substantially along the line XII—XII of Fig. 11.

Each head or unit is equipped with ware take-out mechanism which comprises a rock shaft 25 (Figs. 1 and 3) mounted for rotation and reciprocation in a bearing 26 formed on the finishing mold frame 20. The rock shaft 25 carries a radial pin 27 (Figs. 11 and 12) projecting through an angular slot 28 formed in the bearing 26, said pin 27 carrying an anti-friction roller 29 which rides over the walls of the slot 28. The pin and slot connection between the rock shaft 25 and its supporting bearing 26 permits longitudinal and rotative movement of the rock shaft in the bearing, under the influence of a stationary cam track 30 (Fig. 1) and a cam roll 31 which is fixed to the lower end of said rock shaft 25. A coil spring 32 (Figs. 1 and 3) encircling the rock shaft, operates to normally hold said shaft in its uppermost position so that a lateral take-out arm 33 at the upper end of the shaft will be normally positioned at one side of the finishing mold 19. This take-out arm 33 is adjustable longitudinally of the rock shaft 25 as required by the height of the articles formed in the mold, by manipulating an adjusting nut 69 threaded on the upper end of the rock shaft 25.

Figures 1, 2, 2A:
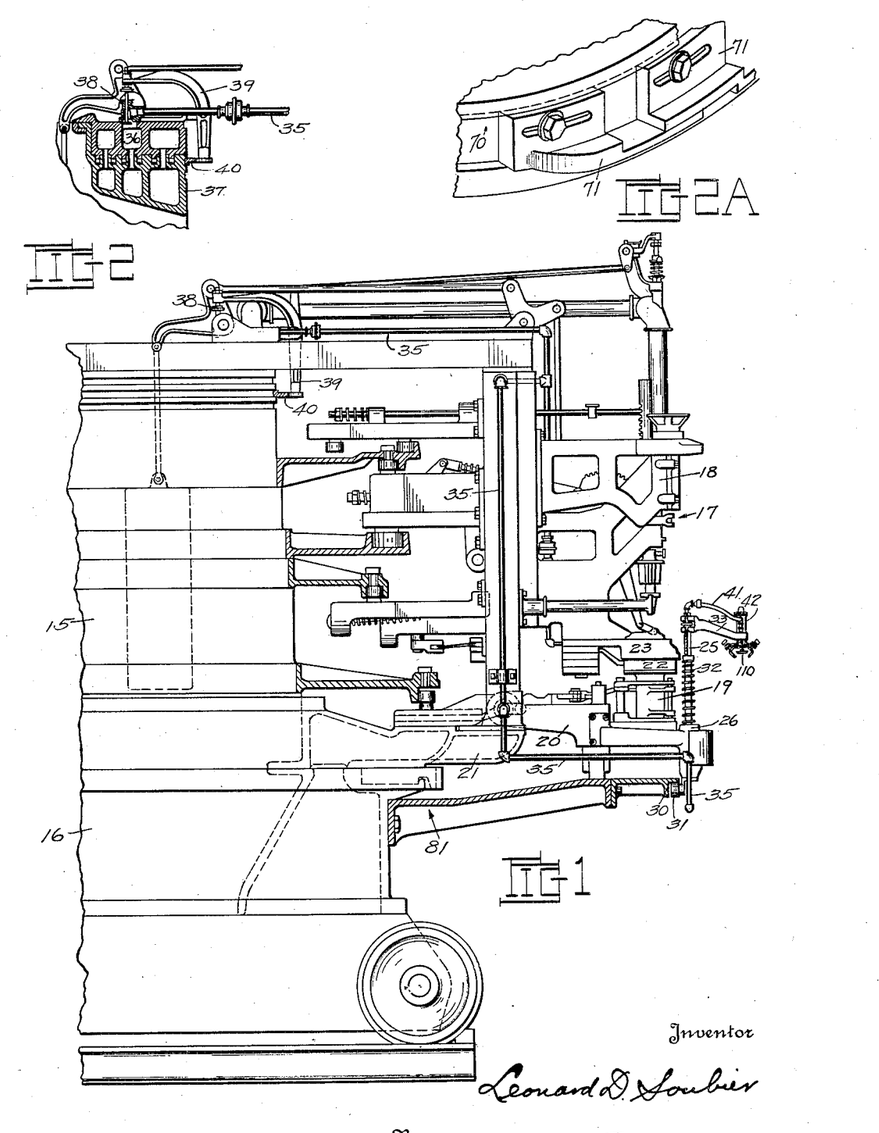
Figure 7:
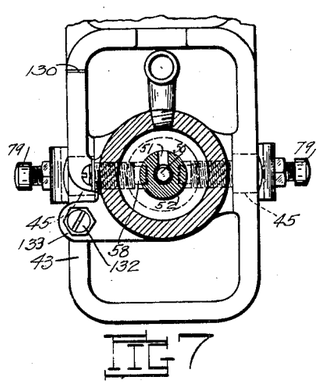
Fig. 7 is a sectional view taken substantially along the line VII—VII of Fig. 5.
Figure 8:
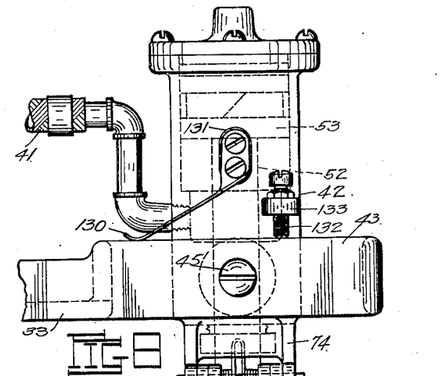
Fig. 8 is a detail fragmentary elevation showing means for operating the take-out device and supplying air to the articles being supported by said device.
Figure 9:
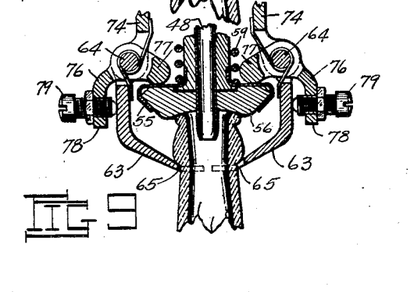
Fig. 9 is a detail sectional view of the take-out device associated with an article disk so constructed that air pressure may be built up within the suported articles.

The rock shaft 25 is formed with an axial passageway 34 extending throughout its length and having communication at its lower end with an air pressure supply pipe 35 (Figs. 1 and 3), which extends radially inward at the upper end of the mold carriage and communicates with an air pressure chamber 36 in a distributor head 37 (Fig. 2). A valve 38 arranged in said head 37 to control the supply of air pressure to the pipe 35 is periodically operated by a lever 39 which is rocked at predetermined time intervals by a stationary cam 40 (Figs. 1 and 2). This cam is formed of segments 71 (Fig. 2—A) which may be removed individually or moved circumferentially in the guideway 70 to change the length of the active cam face, to thereby vary the period of air application or the point at which the cam initially operates the air pressure control valve. Both ends of the cam 40 may be formed of these segments so that the air may be applied and shut off as desired. The upper end of the passageway 34 extending through the rock shaft 25 communicates through a flexible pipe 41 with the cylinder 42 of an air motor mounted in an open frame 43 (Figs. 3, 7 and 8) formed at the outer end of the lateral arm 33. This air motor actuates the take-out device as will be apparent presently. Air pressure supplied through the pipe 41 to the cylinder 42 serves to actuate bottle gripping jaws combined with means to apply air pressure or freely circulating cooling air internally of ware for a predetermined period of time following final shaping of the ware in the mold.

The air motor, of which the cylinder 42 forms a part, is provided with opposed trunnions in the form of removable screws 45 which are journalled in opposed openings formed in the longitudinal side walls of the open frame 43. Thus, the air motor is free to swing in the frame and occupies an upright position at all times so that it may readily engage articles which are to be lifted from a forming mold, and with equal accuracy, transfer these articles to any selected station. To insure proper angular relation between the frame 43 and the air motor so that the take-out device will positively grip articles in the finishing molds, a light spring 130 (Figs. 7 and 8) is fixed at one end to a boss 131 on the cylinder 42 and has its other end bearing lightly upon the upper side of one side bar of the frame 43. Thus, following release of an article from the transfer device, the spring operates to return the motor and parts carried thereby to a position substantially at right angles to the frame 43. To prevent excessive movement under influence of the spring, an adjustable stop is mounted on the cylinder 42. This stop comprises a screw 132 threaded through an ear 133 on the cylinder, the lower end of the screw being adapted to contact with the frame 43 except during swinging of the take-out to the ware releasing position.

Figure 5:
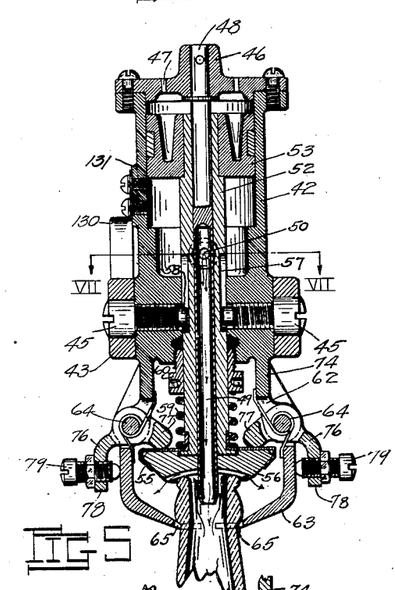
Fig. 5 is a vertical central sectional view of the take-out device and its operating mechanism, together with the means for introducing air into the articles.
Figure 6:
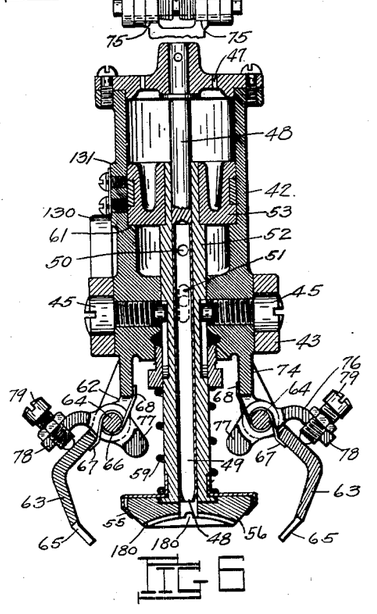
Fig. 6 is a view similar to Fig. 5, showing the take-out device positioned to release an article therefrom or just prior to gripping an article.

The upper end of the cylinder 42 of the air motor is closed by a suitable head 46 formed with bleed openings 47 and rigidly mounting a rod 48 which extends axially through the cylinder 42, terminating at a point beyond the lower end of the latter. This rod 48 is formed with an axial passageway 49 which opens through its lower end and extends throughout a major portion of the length of said rod. A radial port 50 in the rod 48 provides communication between the interior of said passageway 49 and the cylinder 42 when aligned with a slot 51 formed in a reciprocable tube 52 which telescopes over a major portion of said rod 48 (Figs. 5 and 6). This tube 52 is fixed at its upper end to a piston 53 arranged within the air motor cylinder 42 and carries at its lower end a holder 55 for a ware engaging disk 56, said holder being in the form of a pocket and having a clip 72 at one side to take over a marginal portion of the disk. The tube 52 (Figs. 5 and 6) is formed with a pair of diametrically opposed longitudinal ways 57 into which the inner ends 58 of the trunnion screws 45 extend to prevent relative circumferential movement between the rod 48 and tube 52 and to thereby insure alignment of the port 50 and slot 51 at proper intervals. A coil spring 59 encircling the tube 52 and confined between the disk holder 55 and a packing gland 60, operates to normally yieldably retain the elements in the relation shown in Fig. 6, wherein the piston 53 is seated upon an annular shoulder 61 formed on the cylinder wall.

Pairs of apertured ears 62 depend from arms 74 on the lower end of the air motor cylinder 42 (Figs. 5 and 8) at opposite sides thereof to pivotally support article engaging jaws 63. Each jaw is pivotally supported on a hinge pin 64 extending through a pair of said ears 62, each of said jaws being of angular formation as shown in Fig. 5 and having its inner lower end notched to provide a pair of fingers 65 which straddle the neck portion of articles to be lifted from the forming mold at the ware ejecting station. These jaws 63 are normally yieldably held in their outermost position (Fig. 6) by means of coil springs 66 which encircle the hinge pins 64. The extremities 67 of the coil springs 66 bear against the inner faces of the jaw 63 while intermediate portions 68 extend upwardly and lie against the inner face of the arms from which the ears 62 project. The main body of each coil spring is confined between apertured ears 75 through which jaw actuating devices 76 (Figs. 5 and 6) are pivoted to the pins 64 which support the ware engaging jaws 63.

Each of these jaw actuating devices 76 includes an inwardly directed finger 77 which is at all times positioned in the path of movement of the disk 56 for a purpose hereinafter apparent. These actuating devices 76 also include short arms 78 which are arranged at an angle to the finger 77 and adjacent the outer faces of the article engaging jaws 63 and are held in spaced relation thereto by adjusting screws 79. The relative positions of the jaws 63 and arms 78 on the jaw actuating devices 76 controls the spacing between the fingers 65 of the ware engaging jaws. Accordingly, it is seen that manipulation of the adjusting screws 79 is necessary to adapt the jaws for operative engagement with and removal of ware having necks of varying diameters.

An endless ware conveyor 80 (Figs. 3 and 10) is arranged alongside the forming machine to receive ware removed from the mold by the take-out mechanism. This conveyor may function as a leer feeder, or transfer the ware to any desired station. Driving of this ware conveyor 80 in synchronism with movement of the mold carriage of the forming machine and take-out devices associated therewith is effected by running one end of the conveyor 80 over a sprocket wheel 125 fixed to a shaft, one end of which is connected by a universal joint 126 to a shaft 127 which is connected through a reduction gearing 140 to a shaft 141 rotated by a spur gear 128 running in mesh with a ring gear 129 extending around the forming machine. Thus, the lineal and peripheral speeds of the conveyor and machine respectively may be synchronized so that proper transfer of ware from the forming molds to the conveyor may be effected with ease. The arrangement is preferably such that the ware at the instant it is released from the jaws 63 is moving forward in the same direction and at the same speed as the conveyor 80.

In the form of invention now being considered, the article engaging disks 56 are formed with radial grooves or channels 180 on the lower faces so that air injected into the articles by way of the passageway 49 readily escapes through said grooves to thereby prevent building up of internal pressure, which, after the mold is opened, would, in all probability, deform the ware. Thus, cooling air may be continuously circulated through the articles in the finishing molds to thereby firmly set the glass.

In operation, considering the invention to be applied to a forming machine having a continuously rotating mold carriage, the disk supporting arm 33 (Fig. 10) is swung inwardly by action of the cam 30 and rock shaft 25 (Fig. 1) to position the take-out device as shown in Fig. 5. This takes place after the article has been blown to its final form in the finishing mold and after the neck mold has been opened. Inward swinging of the take-out supporting arm 33, takes place simultaneously with lowering of said arm and seating of the disk 56 upon the open upper end of an article in the finishing mold. Continued downward movement of the arm causes a relative sliding movement between the rod 48 and the tube 52 to an extent sufficient to align the port 50 and slot 51 so that air is admitted to the passageway 49 in the rod 48 and thence to the interior of the article which is enclosed in the finishing mold. Due to the formation of grooves in the lower face of the disk 56, this injected air may readily escape so that there is a free circulation of cooling air through the article effectively setting the glass. This flow of air through the aligned port and slot into the passageway 49 is permitted by opening of the valve 38 (Fig. 2) substantially simultaneously with alignment of said port 50 and slot 51. Thus, sufficient pressure is built up within the air motor cylinder 42 below the piston 53 to hold the latter in the position shown in Fig. 5 in which the jaws 63 grip the necks of articles in the molds. Application of cooling air internally of the articles in the finishing molds (Fig. 10) continues from a station just following the final blow in the finishing mold to the station at which the ware is removed from the mold and deposited upon a suitable transfer mechanism. The cam track is formed at both ends with removable segments as heretofore stated so the period of application of air may be readily varied.

Figure 3:
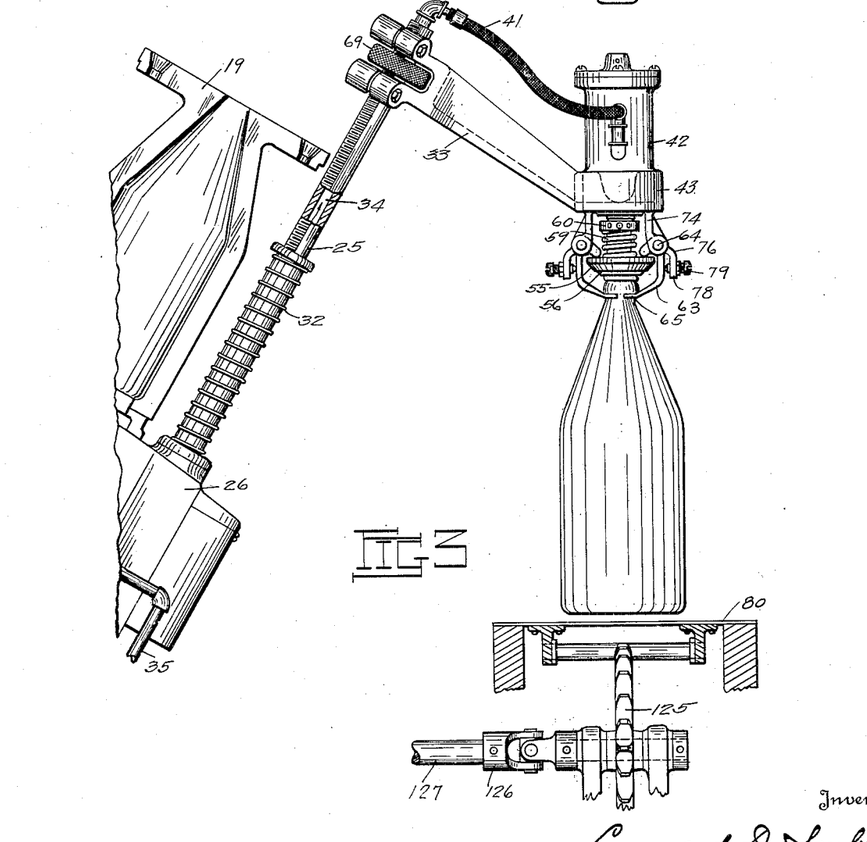
Fig. 3 is a detail elevation showing the finishing mold tilted to its ware ejecting position and the take-out device occupying a position just in advance of the station at which articles are deposited upon the ware conveyor.
Figure 4:
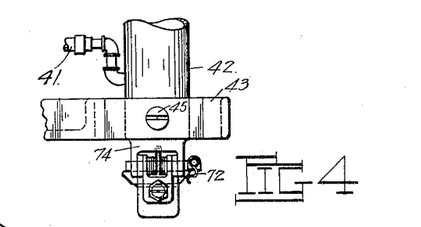
Fig. 4 is a detail fragmentary elevation of the take-out device taken substantially at right angles to the showing in Fig. 3.
Figure 10:
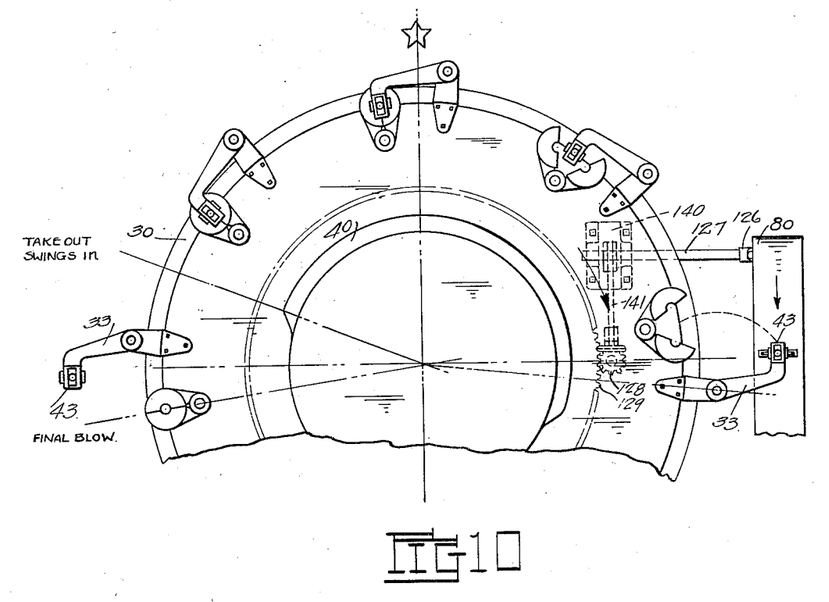
Fig. 10 is a fragmentary plan view showing the manner in which the take-out device operates to transfer an article from the finishing mold to a ware conveyor which carries the ejected ware to any desired station.

When the finishing mold 19 opens at the ware ejecting station, the cam 30 (Fig. 1) operates to swing the take-out carrying arm 33 to the position shown in Figs. 3 and 10 wherein the article is suspended from the jaws directly over a conveyor 80. Because of the maintenance of air pressure below the piston 53 up to this point, the ware engaging disk 56 and article engaging jaws 63 are held in the positions shown in Fig. 5. Simultaneously with positioning of the jaws with the supported article, over the conveyor 80 which is arranged tangentially with respect to the path traveled by the mold (Fig. 10), the cam 40 (Figs. 2 and 10) causes rocking of the lever 39 and closing of the air pressure control valve 38. Thus, the supply of air pressure to the cylinder 43 is shut off and the pressure already built up therein, escapes through the passageway 49, allowing the piston 53 to move downwardly under influence of the spring 59 and seat upon the shoulder 61 as shown in Fig. 6. Thus, the disk 56 moves downwardly, and the article holding jaws swing outwardly to release the article which is thereby deposited upon the conveyor 80 for transfer to any selected station.

In another form of the invention shown in Figs. 13 to 19, inclusive, there is provided means to apply air pressure or freely circulating cooling air internally of articles in the finishing mold following the usual final blow. To this end, the finishing mold frame 85, which is hinged at its inner end 86 to the mold carriage 21 is provided at its outer end with a bearing 87 in which the lower end of a knock-out rock shaft 88 is journalled. The lower end of the rock shaft 88 carries a radial roller 89 which runs in an angular slot 90 formed in the bearing 87, this connection serving to oscillate the rock shaft simultaneously with reciprocation of the latter in its bearing. A cam roll 91 (Fig. 13) is mounted on the lower end of the rock shaft 88 and runs on a stationary cam track 92 suitably attached to the stationary frame 93. This frame 93 also supports a stationary cam track 94 upon which a cam roll 95 runs. This cam roll 95 is journalled in bearings 96 depending from the finishing mold frame end, due to the shape of the stationary cam 94, raises and lowers the finishing mold at proper intervals. A coil expansion spring 97 encircles the rock shaft 88 between the upper end of the bearing 87 and a collar 98 on said rock shaft, so that the latter is normally held in its uppermost position in which the knock-out disk to be described is held at one side of the finishing mold 84.

A laterally directed knock-out arm 99 is adjustable longitudinally upon the upper end of the rock shaft 88, such adjustment and retention of the arm in its adjusted position being effected by an adjusting nut 100 (Fig. 13), threaded upon the upper end portion of the rock shaft and disposed between furcations 101 formed at the inner end of said arm 99. An extension in the form of an elongated air chamber 102 is rigidly fixed to the outer end of the lateral arm 99 (Fig. 13) and is provided with an inlet 103 to which an air supply pipe 104 is connected. This supply pipe 104 leads to the upper end of an axial passageway 105 extending through the rock shaft 88. A pipe 106 communicates with the lower end of said axial passageway 105 and leads inwardly for connection to any preferred source of air supply (not shown).

Figures 13, 14, 15, 16, 17, 18, 19:
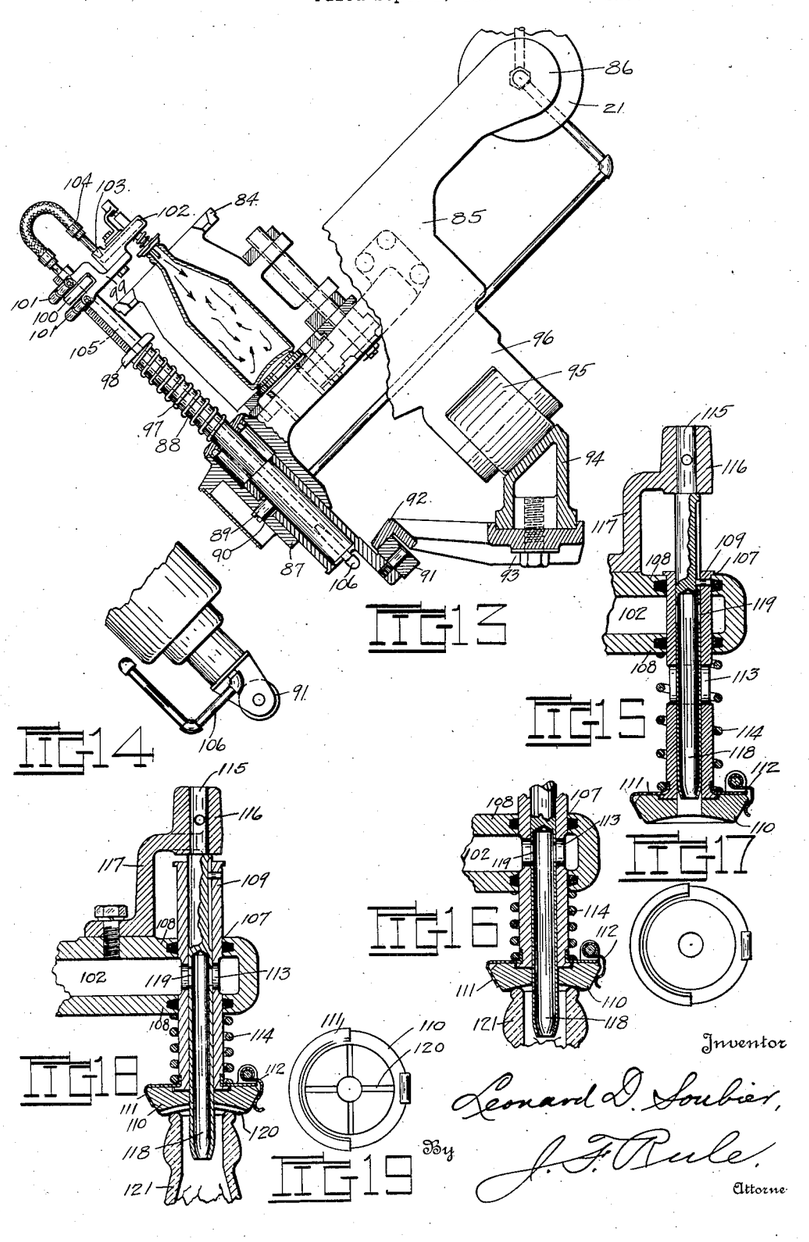
Fig. 13 is a detail sectional elevation showing a rotary finishing mold equipped with means to supply air through the knock-out disk to the interior of the ware.
Fig. 14 is a fragmentary elevation showing the air supply line connection to the rock shaft which carries the knock-out arm and disk.
Fig. 15 is a detail sectional view showing a part of the means for conducting air to and through the knock-out disks, the elements being in position to cut off flow of air.
Fig. 16 is a view somewhat similar to Fig. 15, showing the elements in position to permit flow of air through the knock-out disk.
Fig. 17 is a bottom plan view of a knock-out disk formed to completely seal the upper open end of an article in the finishing mold so that pressure may be built up in the article.
Fig. 18 is a view similar to Fig. 16, but shows a modified form of disk provided with radial grooves or channels permitting exhaust of air injected into the article upon which it is seated.
Fig. 19 is a bottom plan view of the grooved knock-out disk.

A pair of aligned guide openings 107 is formed in the upper and lower walls 108 of the air chamber 102 for a sleeve or tube 109 which carries a knock-out disk 110 at its lower end. Connection between the knockout disk 110 and the sleeve 109 is preferably effected by fixing a metal holder 111 to the lower end of said sleeve, said holder being of cup-like formation and having a retaining clip 112 at one side which snaps over the marginal portion of the disk (Fig. 18). Radial ports 113 are formed in the sleeve 109 at an intermediate point and are adapted at times to be disposed within the air chamber 102 for a purpose hereinafter apparent. A coil expansion spring 114 encircles the sleeve 109 between the knock-out disk holder 111 and the bottom wall 108 of the air chamber and serves to normally and yieldably hold the disk 110 and sleeve 109 in their lowermost positions wherein said ports 113 are opened to the atmosphere. The sleeve 109 is telescoped over and splined to a stationary stem 115 (Fig. 18), said stem having its upper end fixed in a holder 116 on bracket 117. This stem 115 is formed with a passageway 118 extending from its lower end to a point substantially in line with the upper side of the air chamber 102. Radial ports 119 are formed in the hollow portion of the stem 115 so that when the sleeve 109 is moved upwardly a sufficient distance, these ports and the ports 113 in said sleeve will be brought into register with each other permitting flow of air from the chamber 102 outwardly through said passageway 118 in the stem 115.

In the form of invention shown in Fig. 18, the disk 110 is provided with radial grooves 120 which permit ready exhaust of air injected into the article 121 so that the injected air merely has a cooling effect upon the glass and does not build up internal pressure. In Fig. 15, the bottom of the disk 110 is perfectly plain and is intended to more or less seal the upper end of an article upon which it is seated so that with injection of air pressure through the passageway 118, a certain degree of pressure is built up internally of the ware to cool the glass and at the same time prevent collapse of the walls.

In operation, the finishing mold is rotated about a vertical axis and is periodically brought to a final blowing station and then to a ware ejecting station. Just after the usual blowing head (not shown) is removed from over the neck of the article in the finishing mold, the cam 92 (Fig. 13) operates to rock the shaft 88 causing seating of the knock-out disk 110 upon the upper open end of an article in the finishing mold, as shown in Fig. 18. Complete seating of the disk upon the article brings the ports 113 and 119 (Fig. 18) into register with each other, allowing passage of air pressure or freely circulating cooling air to the interior of said article which at this time is enclosed in the mold. After the mold opens, the rock shaft 88 is moved upwardly in its bearing by the coil spring 97, causing swinging of the knock-out arm 99 and parts carried thereby laterally away from the open finishing mold. The arm 99 and knock-out disk 110 serve to hold the article 121 in position on the mold bottom during the opening of the mold, as is customary in operation of machines equipped with this general type of knock-out arm.

Modifications may be resorted to within the spirit and scope of the appended claims.

What I claim is:

1. In a glassware forming machine, an annular series of ware forming molds rotatable about a vertical axis, disks individual to the molds adapted to seat upon ware in the molds during predetermined periods of time, and means actuated by engagement between said disks and the ware to grip the ware for transfer from the molds.

2. In a glassware forming machine, a ware forming mold rotatable about a vertical axis, a disk movable about said axis with the mold and adapted at times to seat upon the open upper end of ware in said mold, and means actuated by complete seating of the disk upon the ware to grasp the ware for transfer from the mold.

3. In a glassware forming machine, an annular series of ware forming molds, and mechanism actuated by engagement of a portion thereof with articles in the molds to cause said mechanism to grip the articles for transfer from the molds.

4. In a glassware forming machine, a support, a finishing mold on the support, means to blow blanks to their final form in said mold, and mechanism mounted on said support to transfer blown blanks from the finishing mold, said mechanism actuated periodically by engagement of a portion thereof with the blown blanks.

5. In a glassware forming machine, the combination of a ware finishing mold; ware take-out mechanism including a disk seatable upon ware in the mold for a predetermined period of time, ware engaging jaws operatively positioned by said seating of the disk, and means to swing the disk and jaws with the article laterally away from the mold at a predetermined station.

6. In a glassware forming machine, the combination of a ware finishing mold; ware take-out mechanism including a disk seatable upon ware in the mold for a predetermined period of time, ware engaging jaws operatively positioned by said seating of the disk, means to swing the disk and jaws with the article laterally away from the mold at a predetermined station, a conveyor arranged adjacent and below the path followed by the take-out device in its movement away from the mold, and automatic means to release articles from the jaws for deposit upon said conveyor.

7. In a glassware forming machine, the combination of a ware finishing mold; ware take-out mechanism including a disk seatable upon ware in the mold for a predetermined period of time, ware engaging jaws operatively positioned by seating of said disk, means to swing the disk and jaws with the article laterally away from the mold at a predetermined station, means to maintain operative engagement between said jaws and ware during their movement away from the molds, and automatic means to release the ware at a predetermined point.

8. In a glassware forming machine, the combination of a ware finishing mold; ware take-out mechanism including a disk seatable upon ware in the mold for a predetermined period of time, ware engaging jaws operatively positioned by said seating of the disk, means to swing the disk and jaws with the article laterally away from the mold at a predetermined station, and means to adjust the ware engaging jaws for use with ware of various sizes.

9. In a glassware forming machine, a rotary mold carriage, an annular series of ware forming molds thereon, ware take-out mechanism individual to the molds, said take-out mechanism including a take-out arm movable laterally relative to the corresponding mold, an air motor hinged to an end portion of said arm, a disk seatable upon ware in the finishing mold, ware engaging jaws pivoted to one end of the air motor, said jaws being movable into ware engaging position by and upon complete seating of the disk upon the ware, means actuated by seating of the disk to supply air pressure to the air motor, connection between said air motor and disk whereby maintenance of air pressure within the former effects transferring engagement between said jaws and ware, and automatic means to release ware from the jaws at a predetermined station.

10. In a glassware forming machine, a rotary mold carriage, an annular series of ware forming molds thereon, ware take-out mechanism individual to the molds, said take-out mechanism including a take-out arm movable laterally relative to the corresponding mold, an air motor hinged to an end portion of said arm, a disk seatable upon ware in the finishing mold, ware engaging jaws pivoted to one end of the air motor, said jaws being movable into ware engaging position by and upon complete seating of the disk upon the ware, means actuated by seating of the disk on the ware to supply air pressure to the air motor, connection between said air motor and disk whereby maintenance of air pressure within the former effects transferring engagement between said jaws and the ware, automatic means to release ware from the jaws at a predetermined station, and means functioning at least during transfer of ware from the mold to cause continuous movement of air through said motor for injection into ware being transferred from the mold.

11. Ware take-out mechanism for glassware forming molds comprising ware gripping jaws, a disk seatable upon ware in the mold, means actuated by movement of the disk to effect operative engagement between said jaws and ware, means to move the take-out device away from the mold, and automatic means to release articles therefrom at a predetermined station.

12. The combination with a machine for forming glass articles comprising a mold, of means for transferring articles from the mold including a swinging arm, an air motor thereon, gripping jaws mounted on said arm, a contact piece movable relative to the arm, means to move said arm and bring said contact piece into engagement with the article and thereby cause a relative movement of said arm and contact piece, connections between said contact piece and jaws whereby said relative movement causes the jaws to be brought into gripping engagement with the article, and means controlled by the relative movement of said contact piece and arm to bring the motor into activity for holding said jaws in article gripping position.

13. In a machine for forming hollow glass articles, the combination of a mold carriage, means for rotating it about a vertical axis, partible finishing molds thereon, combined article holding and take-out devices individual to and traveling with the molds, each of said devices including partible jaws adapted to hold articles prior to and during opening of the corresponding mold and support the articles after opening of the mold, a disk disposed between the jaws and adapted for contact with the article at times, said disk having an air passageway therein, and means for blowing air through the passageway and into the articles.

14. In a machine for forming hollow glass articles, the combination of a finishing mold in which an article is blown to finished form, a mold bottom, a support on which said mold and mold bottom are carried in an inclined position, a disk, means for seating the disk on the blown article in the mold, an injector tube extending through the disk, means for projecting said tube downward within the article, means for supplying cooling air through said tube and causing it to circulate within said article in the mold, means for opening the mold and leaving the article supported by the mold bottom and disk, means for withdrawing the tube to clear the article for discharge, and means for then withdrawing the disk to release the article.

15. In a machine for forming hollow glass articles, the combination of a finishing mold in which an article is blown to finished form, a mold bottom, a support on which said mold and mold bottom are carried in an inclined position, a rock shaft, a rock arm carried thereby, a disk supported on the rock arm, means for actuating the rock shaft and disk for causing the latter to seat on the article in the mold, an injector tube extending through the disk, means for projecting said tube into the article, means for supplying cooling air through said tube, means for withdrawing the tube from said article, means for opening the mold, and means for withdrawing the disk to release the article.

Signed at Toledo, in the county of Lucas and State of Ohio, this 27th day of August, 1927.

LEONARD D. SOUBIER.